United States Patent
Honey

(10) Patent No.: US 7,470,180 B2
(45) Date of Patent: Dec. 30, 2008

(54) ROCK TRAP FOR COMBINE HEADER

(75) Inventor: Gregory J. Honey, Bracken (CA)

(73) Assignee: Honey Bee Manufacturing Ltd. (CA)

( * ) Notice: Subject to any disclaimer, the term of this patent is extended or adjusted under 35 U.S.C. 154(b) by 0 days.

(21) Appl. No.: 11/806,393

(22) Filed: May 31, 2007

(65) Prior Publication Data
US 2008/0161077 A1   Jul. 3, 2008

(30) Foreign Application Priority Data
Dec. 29, 2006   (CA)   ................................. 2572274

(51) Int. Cl.
*A01D 75/18* (2006.01)
*A01F 12/16* (2006.01)
*A01F 21/00* (2006.01)

(52) U.S. Cl. ..................... 460/105; 56/10.2 J

(58) Field of Classification Search ............... 56/10.2 J, 56/10.2 R, 102, 14.5, 14.6, 181, 208; 460/1, 460/2, 105, 106
See application file for complete search history.

(56) References Cited

U.S. PATENT DOCUMENTS

| | | | | |
|---|---|---|---|---|
| 2,305,159 | A * | 12/1942 | Heckman et al. | 460/106 |
| 3,664,348 | A * | 5/1972 | Maiste et al. | 460/105 |
| 3,675,660 | A * | 7/1972 | Girodat | 460/1 |
| 3,805,798 | A * | 4/1974 | Girodat | 460/1 |
| 3,971,390 | A | 7/1976 | McDuffie et al. | |
| 4,195,644 | A * | 4/1980 | Ryczek | 460/106 |
| 4,305,244 | A | 12/1981 | Seymour et al. | |
| 4,335,563 | A * | 6/1982 | Rice et al. | 460/2 |
| 4,335,564 | A * | 6/1982 | Knepper | 460/105 |
| 4,335,565 | A * | 6/1982 | Knepper et al. | 460/2 |
| 4,404,975 | A | 9/1983 | Westby | |
| 4,467,819 | A * | 8/1984 | Musser et al. | 460/106 |
| 4,538,625 | A * | 9/1985 | Fortune et al. | 460/105 |
| 4,657,029 | A * | 4/1987 | Helm et al. | 460/106 |
| 4,768,525 | A * | 9/1988 | Tanis | 460/106 |
| 5,019,014 | A * | 5/1991 | Hirsch et al. | 460/106 |
| 5,273,488 | A * | 12/1993 | Hollevoet | 460/106 |
| 5,324,231 | A * | 6/1994 | Van Herpe et al. | 460/106 |
| 5,443,421 | A * | 8/1995 | Heintzman | 460/106 |
| 5,464,371 | A | 11/1995 | Honey | |
| 5,702,300 | A | 12/1997 | Wilson | |
| 6,116,008 | A * | 9/2000 | Digman et al. | 56/15.8 |
| 6,269,618 | B1 * | 8/2001 | Digman et al. | 56/10.2 J |
| 6,298,641 | B1 * | 10/2001 | Digman et al. | 56/10.2 J |
| 6,330,782 | B1 * | 12/2001 | Digman et al. | 56/15.8 |
| 6,601,372 | B1 | 8/2003 | Heinsey et al. | |
| 6,705,067 | B2 * | 3/2004 | Schroeder et al. | 56/14.6 |
| 6,865,871 | B2 * | 3/2005 | Patterson et al. | 56/181 |
| 7,207,165 | B2 * | 4/2007 | Crego et al. | 56/10.2 J |
| 2006/0277883 | A1 * | 12/2006 | Berger et al. | 56/10.2 J |
| 2007/0028576 | A1 * | 2/2007 | Crego et al. | 56/10.2 J |

FOREIGN PATENT DOCUMENTS

DE    4201545 A1 *  7/1993

* cited by examiner

*Primary Examiner*—Árpád Fábián-Kovács
(74) *Attorney, Agent, or Firm*—Miles & Stockbridge P.C.; David R. Schaffer, esq.

(57) ABSTRACT

A rock trap disposed in a feeder adapter of a combine directly behind a sickle bar of a combine header and in an area in front of a rearwardly directed conveyor located for receiving cut crop from transversely directed conveyor of the header. The rock trap has a trap door which can be selectively opened so as to drop beneath the header rocks collected therein.

19 Claims, 10 Drawing Sheets

ROCK TRAP FOR COMBINE HEADER

This invention claims the benefit of convention priority of Canadian Patent Application No. 2,572,274, filed Dec. 29, 2006, entitled Rock Trap For Combine Header, the disclosures of which are incorporated herein in the entireties

FIELD OF THE INVENTION

This invention resides in a combine header system, and more particularly to a structure for effectively trapping and selectively dispensing of rocks and other such debris encountered during crop harvesting.

BACKGROUND OF THE INVENTION

A consistent problem which exists in the operation of a combine type harvester is that of rocks and other solid debris being picked up by the header of a combine from the ground surface, together with the cut crop, are carried into the feeder housing which in turn carries the crop up to the threshing mechanism of the harvester. Such debris, depending on its size and shape, may cause damage to the conveyors which transfer the cut crop from the header to the feeder housing of the combine, particularly where such conveyors are of the auger type, as well as affecting the conveyor in the feeder housing. However, severe damage usually occurs if a rock, for example enters the threshing area, which commonly consists of a beater arrangement.

Accordingly, various forms of stone traps have been developed, for example as shown in early U.S. Pat. No. 3,971,390, Jul. 27, 1976 to McDuffie et al., which have usually been found relatively effective if located in the feeder housing provided for transferring the cut crop in the combine unit from the header to the threshing area. Other known designs have located a rock trap or sump at the entrance to the concave of the beater of the threshing mechanism, such as in U.S. Pat. No. 5,702,360, Dec. 30, 1997 to Wilson. Various means have been developed for automatic dumping of the rocks behind the header, such as mechanisms which actuate to drop the rocks depending on the weight occurring on the trap door. More recently, more elaborate detection apparatus, such as electronic detecting means have been developed for operation of a trap door. An example of such an arrangement is shown in U.S. Pat. No. 6,601,372, Aug. 5, 2003 to Helnsey.

Such systems have added significantly to the cost of a combine unit, but are nevertheless utilized because of the severity of the damage which a solid article entering the combine unit can cause. On the other hand, because of the conditions to which a combine is subjected, including dust, jamming of the crop, etc., damage which does occur to the more complex detection system itself as well to the mechanism which it operates can be costly. The consequences of their failure, continues to be a serious problem. As an alternative, more simple devices which are mounted on the header, rather than in association with feeder housing of the combine have been used. Such devices are commonly referred to as dams and are shown, for example, in U.S. Pat. No. 6,070,401, Jun. 6, 2000 to Johnson. Clearly, however, they are not practical for use with most types of crop harvesting in that they interference with the normal delivery of the cut crop from the sickle bar.

SUMMARY OF THE INVENTION

It is an object of the present invention to provide a rock trap structure of economical design and one which is particularly effective with current header designs utilizing belt type crop conveyors.

One aspect of the present invention resides in a header unit and feeder adapter combination for use with a combine unit in harvesting a crop, wherein the header unit includes a framework carrying a driven sickle bar mechanism extending along a front edge thereof and defining a central opening in the framework for the reception therein of the feeder adapter. The header unit includes a pair of conveyor means for receiving cut crop from the sickle bar and delivering the cut crop transversely toward the central opening. The feeder adapter includes a frame structure with rear attachment means thereon for attachment to a framework of an intake feeder of the combine unit. Selectively interlocking means are provided for attachment of the frame structure of the feeder adapter to the header unit when the feeder adapter is driven by the combine unit into the central opening from behind the header unit. A conveyor belt means is located within the feeder adapter for collecting cut crop delivered by the conveyor means of the header unit, and a drive means is provided for moving the belt means in a direction to deliver the cut crop rearwardly towards the intake feeder of the combine unit. The feeder adapter in combination with the header unit define an open rock collecting area forward of the conveyor belt means and rearward of the sickle bar.

Another aspect of the invention resides in a combine header having a transversely extending framework with rear connection means at a central portion thereof for attachment to a front intake housing of a combine unit. The combine header has a front crop cutting sickle bar mechanism extending along a forward edge of the framework, and transverse conveyor means located rearwardly of said sickle bar for moving the cut crop from behind the sickle bar to an area at a central area of the framework. The header further has a rearwardly directed feeder means at the central portion of the framework for feeding the cut crop received from the transverse conveyor means rearwardly to the intake housing of the combine unit, the rearwardly directed feeder means having a forward end spaced behind the sickle bar and thereby providing a rock collecting area. A trap door means is provided forward of the rearwardly directed feeder means and is normally held in a closed condition so as to form a bottom surface of the rock collecting area. A trap door operating motor means is connected to the trap door means for selectively providing movement of the trap door to an open rock dispensing portion.

In yet another form of the invention, there is provided a separate combine feeder adapter for use in a combine header for feeding cut crop rearwardly into an intake defined by a frame of an intake feeder of a combine unit to which the feeder adapter is attached. The combine header is of the type having a transverse conveyor system for transferring the cut crop from behind a length of a sickle bar of the combine header to the combine feeder adapter. The combine feeder adapter includes a framework having a foremost portion for positioning behind the sickle bar of the combine header, and a rear portion for attachment to the frame of the intake feeder of said combine unit when the combine unit, feeder adapter, and header are connected for operation. The feeder adapter has conveyor means for receiving the cut crop directly from the transverse conveyor system of said header and delivering the cut crop rearwardly into said feeder means. The feeder conveyor means has a forward end positioned rearwardly of the foremost portion of its framework and thus defines a space between the sickle bar and the forward end of its conveyor means. A rock trap door is located at least partially in the space behind the foremost portion of the framework and is normally positioned to form a bottom of the rock trap, the trap door being selectively movable from a normal closed position to an open position for dropping below the combine header rocks and other debris accumulated in the rock trap.

DETAILED DESCRIPTION OF THE INVENTION

Figure 1:
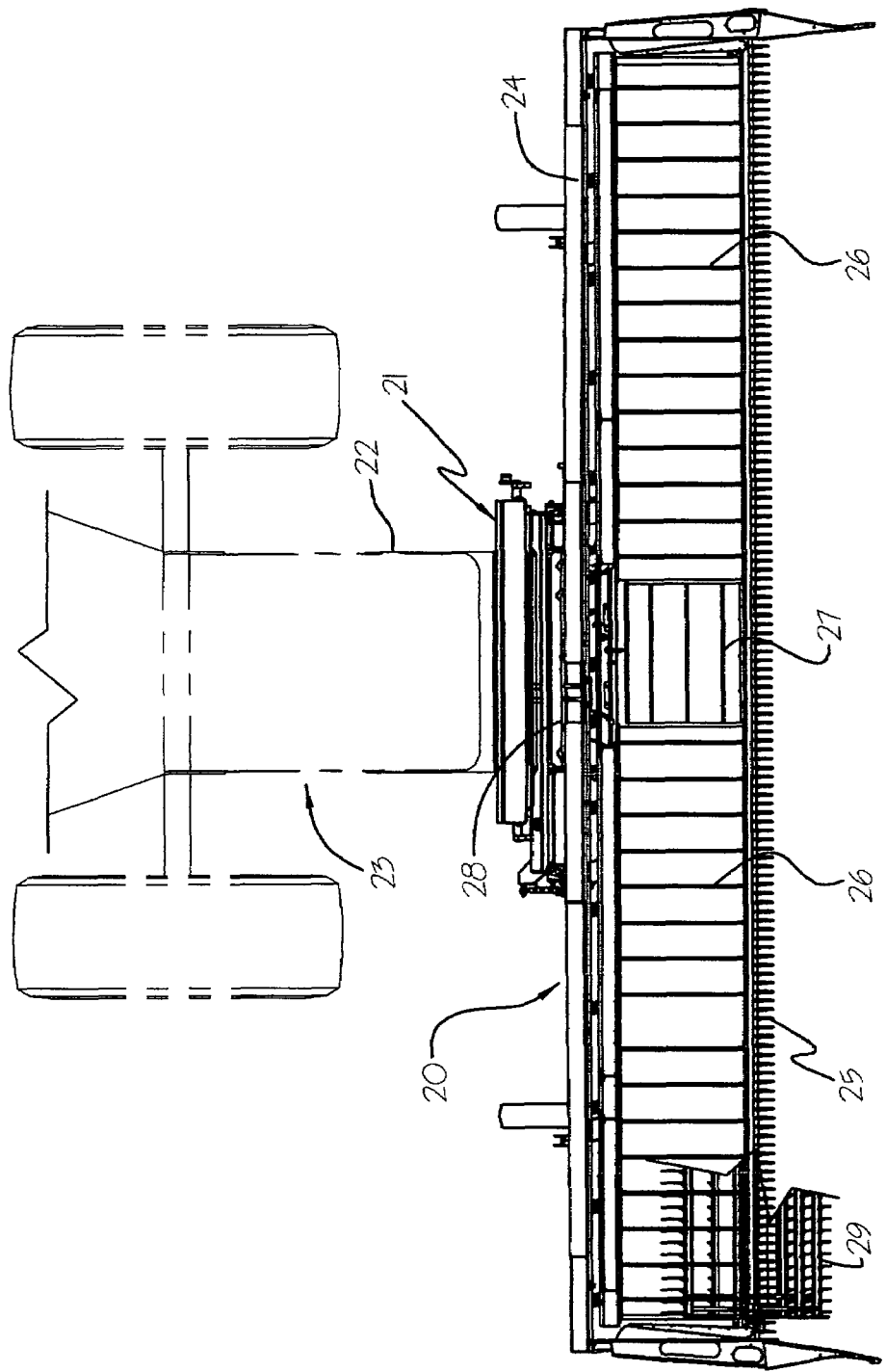
FIG. 1 is a plan view of a combine header system incorporating a feeder adapter of the prior art and illustrating the relation of the combine header system to a combine unit.

In FIG. 1 there is shown by way of a plan view the basic parts of a known header/feeder adapter combination of a type forming the bases of applicant's U.S. Pat. No. 5,464,371, Nov. 7, 1995, Gregory J. Honey. With reference to FIG. 1, there is described a combine header 20 including a feeder adapter 21 which is mounted in the feeder housing 22 of a combine unit 23. As may be noted, the header 20 includes a main frame 24 provided with a sickle bar 25 extending along the front edge thereof. A rotating reel 29 (partially shown) extends the width of the header 20 above the sickle bar 25 for ensuring the feed of the standing crop to the sickle bar as well as subsequently pushing the cut crop onto a pair of drapers or conveyor belts 26,26. The pair of conveyor belts 26,26 carry the cut crop delivered rearward from the sickle bar 25 to the normally rearwardly travelling conveyor 27 of the feeder adapter 21. The feeder adapter 21 further includes in the rear part thereof a feed means 28 which collects the cut crop from the conveyor 27 and accelerates its travel into the feeder housing 22 of the combine unit 23.

Figure 2:
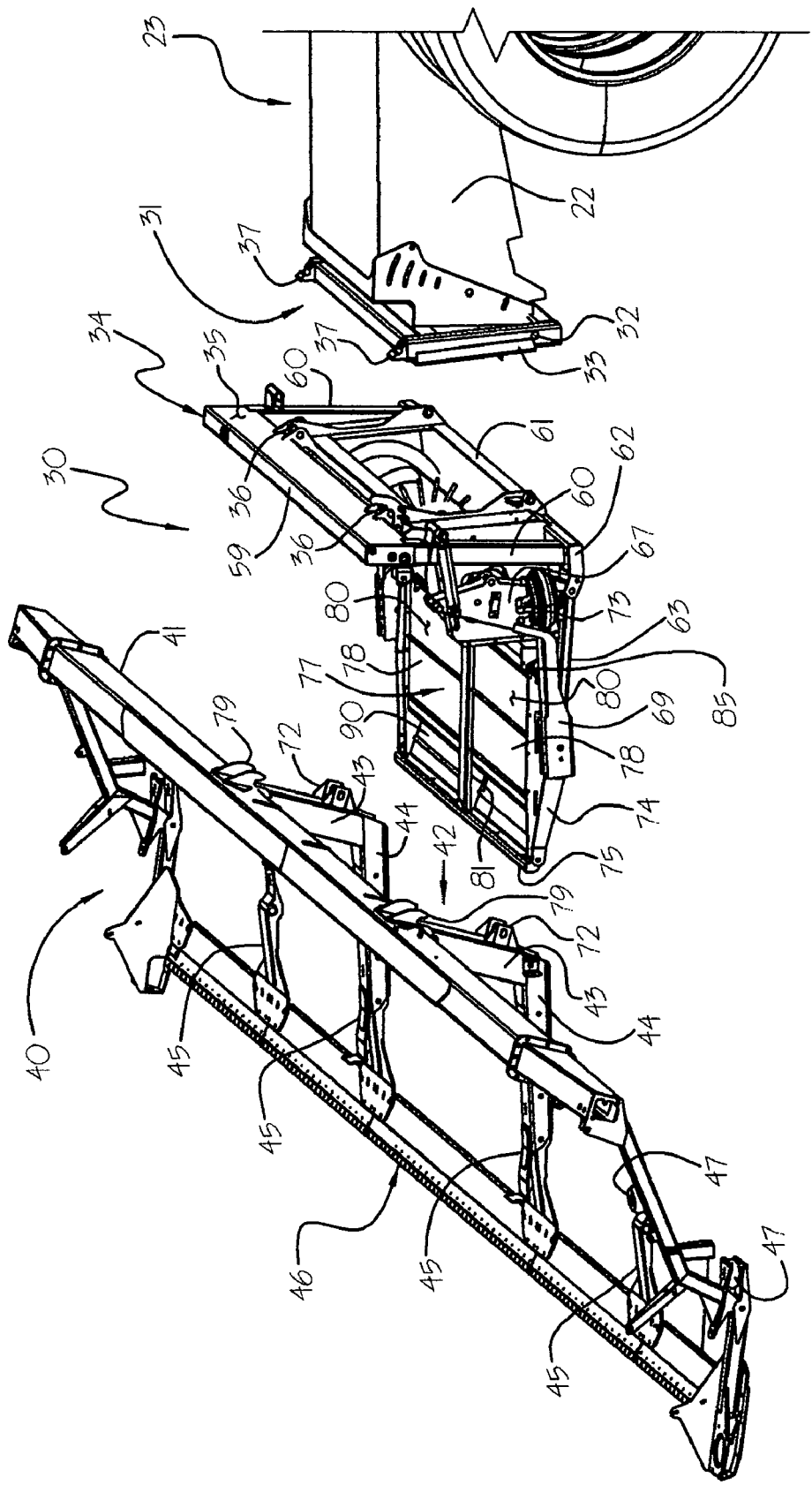
FIG. 2 is a perspective view illustrating the manner of bringing together the feeder adapter and combine header of the present invention with a combine unit in preparation for utilizing in the combining of a crop.
Figure 3:
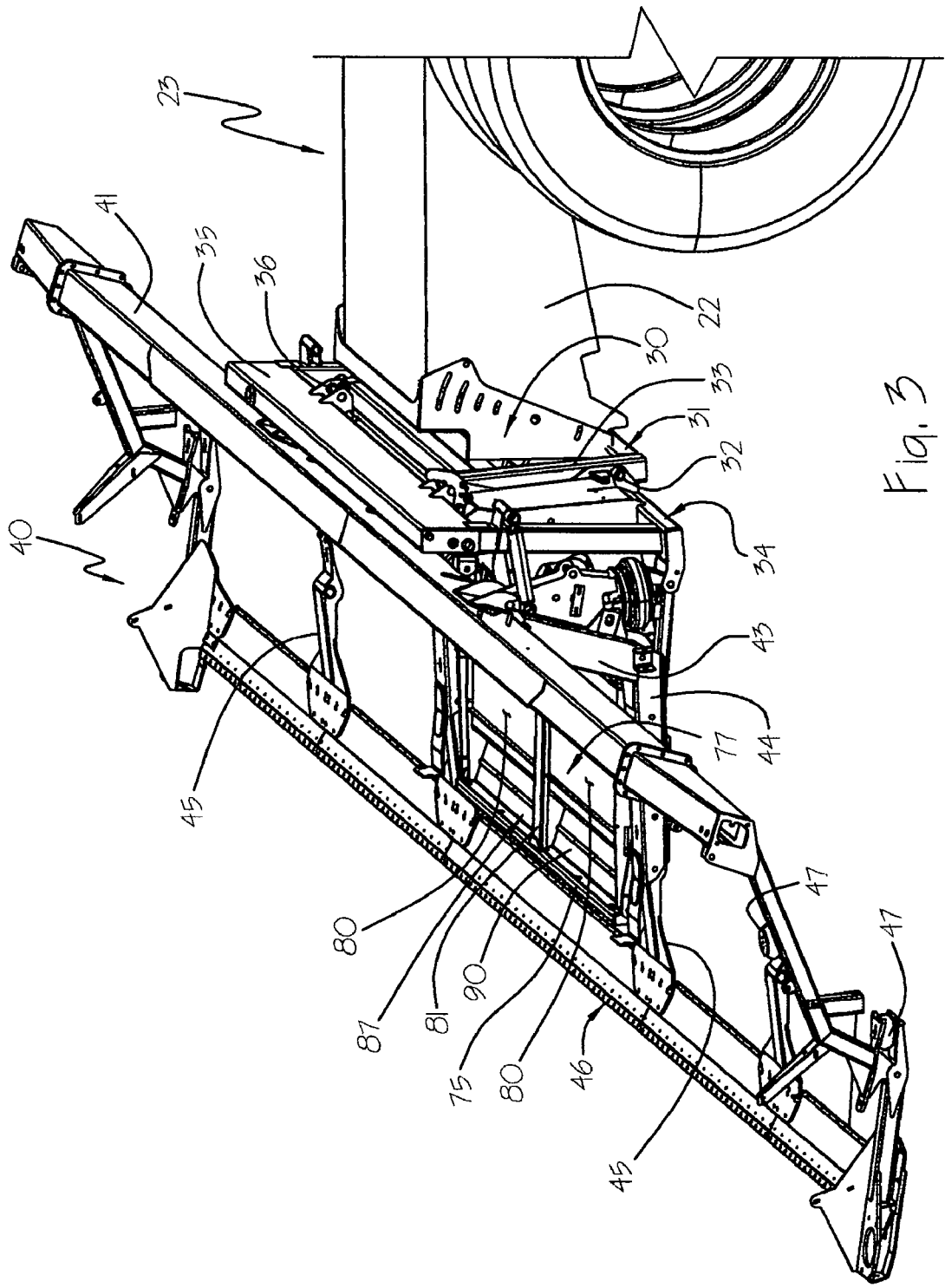
FIG. 3 is a view similar to FIG. 2 after the three separate components have been brought together for the combining of a crop.

Referring now to features of the present invention there is shown in FIGS. 2 and 3, a forward portion of a combine unit 23 is the prime mover for the overall combine as operated in the field and it includes a threshing component (not shown) for receiving the cut crop. The forward portion of the combine unit includes the combine feeder house 22 and in the embodiment of the invention as illustrated herein, it receives the cut crop from the rear of a separate feeder adapter 30 and delivers the cut crop to the threshing component (not shown). There is made available with the feeder adapter 30 a feeder house adapter mounting member 31, constructed to have mounted thereon the particular make and model of the feeder adapter 30 This feeder house adapter mounting member 31 allows a single model of the feeder adapter 30 of the present invention to be mounted on combine units of various makes. As will become apparent in the following description, the feeder house adapter mounting member 31 may remain affixed to the combine unit, but includes an interconnection 32 at the bottom thereof to permit a forward frame portion 33 (FIG. 2) thereof to pivot relative to the front of the combine unit 23 during locking of the feeder adapter 30 to the front of the feeder housing 22.

Figure 6:
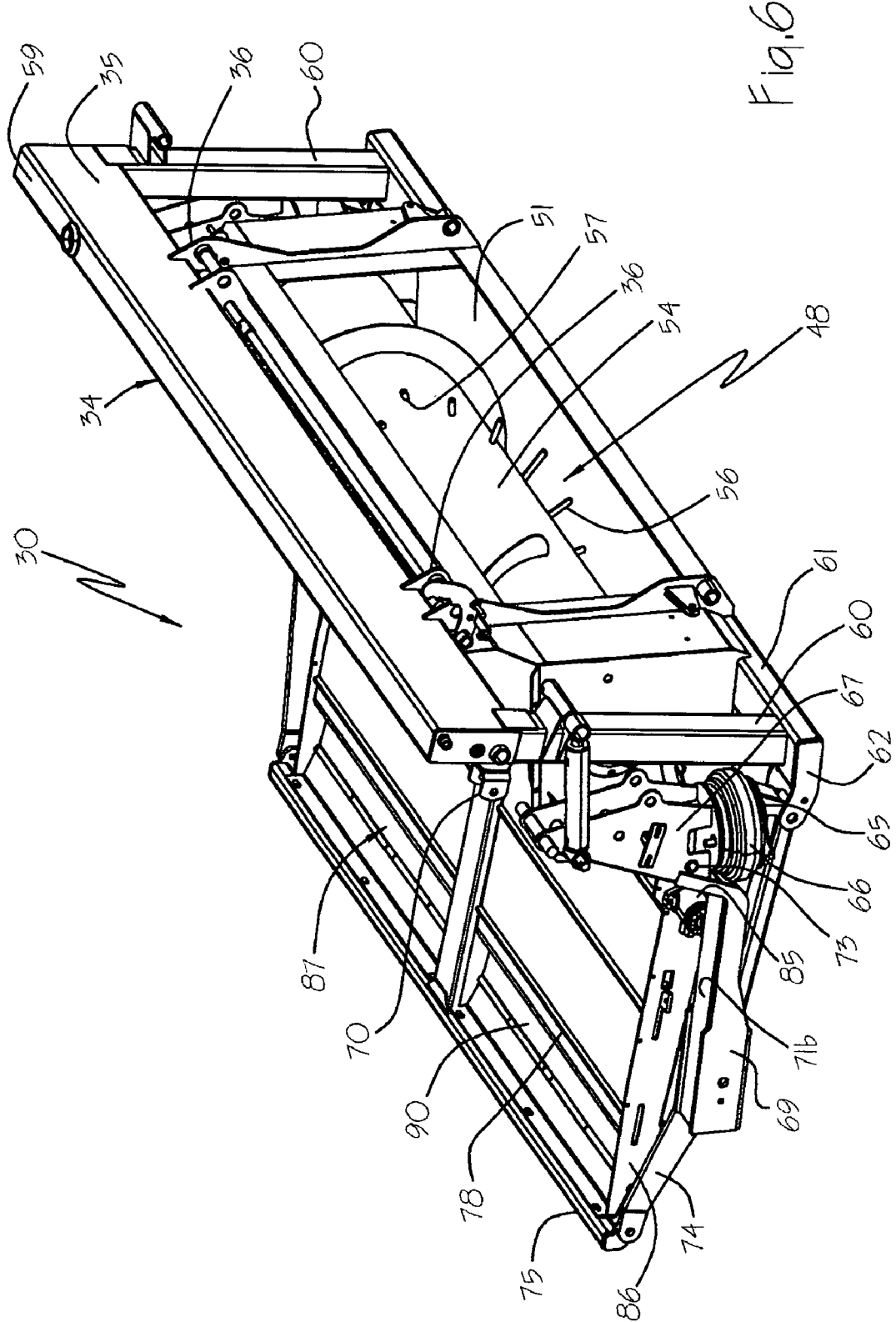
FIG. 6 is a rear perspective view of the feeder adapter shown in FIG. 5.

A rear basic framework 34 of the feeder adapter 30 has a rear surface 35 from which attachment portions 36 (FIGS. 2 & 6) project and interconnect with attachment portions 37 (FIG. 2) on the frame portion 33 of the feeder house adapter mounting member 31. The interconnection can be quickly completed by manipulating the forward frame portion 33 against the rear surface 35 and engaging the attachment portions 36,37 and inserting appropriate locking pins 32 (FIG. 3). The feeder adapter 30 may be mounted on a carriage (not shown) for transport from one cropping area to another, but the combine unit 23 can travel from different cropping areas with the feeder adapter 30 per se in a mounted condition as the feeder adapter 30 is of less width than the combine unit 23, and is, of course, of a considerably less width than a complete combine header unit 40, a skeleton of the framework of which is shown in FIGS. 2 and 3.

Figure 4:
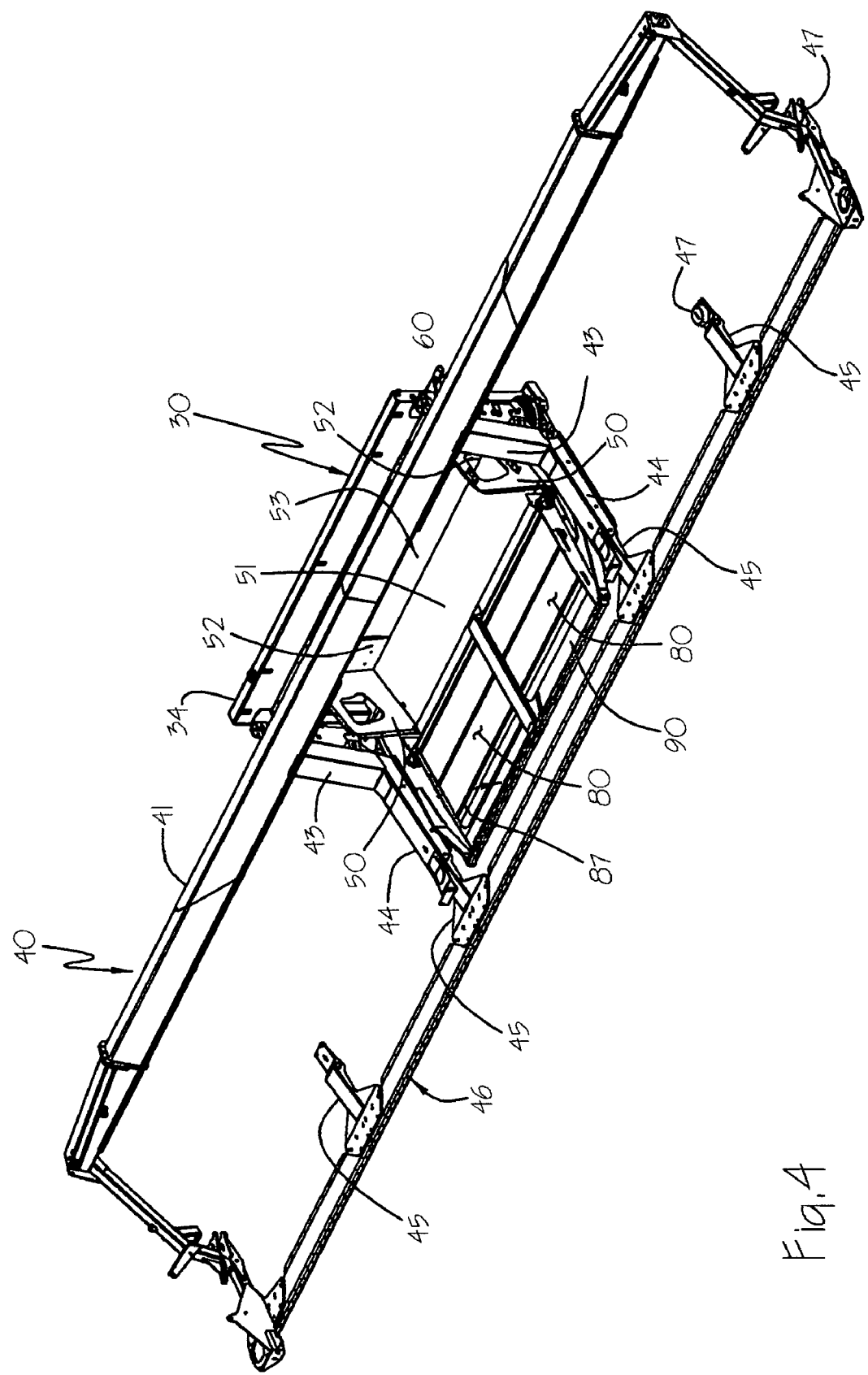
FIG. 4 is a perspective front view of the present invention illustrating the relationship of the feeder adapter within the framework of an overall combine header.

Reference is made to FIGS. 2 to 4, wherein the combine header unit 40 is not shown with all of its parts, for the sake of clarity in describing its relationship to the feeder adapter 30 (FIG. 2) before and after the feeder adapter and combine header unit are united to form a completed combine header. It may be seen that the framework of the combine header unit 40 includes a main upper rear transverse beam 41. There are a number of downwardly projecting struts 43 attached at the upper ends to beam 41. Two of such struts which are on opposite sides of a rear opening 42 only are shown (FIG. 2). These struts 43 are provided with a pair of forwardly projecting frame member 44 depending struts 43, which are of an inverted U-shape for purposes to be described below. Connected to forward ends of the rigid frame member 44, and other frame members (not shown), are forwardly extending support members 45 which support at their forward ends, a sickle bar assembly 46 of the header 40. The sickle bar assembly 46 is of a flex-head type with the supports thereon being pivotally connected to the rigid member 45 and biased downwardly by a force which can be controlled in view of the presence of air bags, one of which is shown at 47 in FIGS. 2 and 3. The header includes, of course, transverse extending conveyors of the type illustrated in FIG. 1 as 26,20, preferably of the canvas or belt type which carry cut crop which enters the head unit behind the sickle bar assembly 46 in a direction toward the area between the rigid frame members 44,44 which define an open area in front of rear opening 42.

As previously described, the rear base framework 34 of the feeder adapter is rigidly attached when in an operating mode to the feeder house adapter mounting member 31 which in turn is affixed to the feeder house 22 of the combine unit 23. Located in front of and secured to the basic framework 34 of the feeder adapter are side walls 50,50 and floor 51 of a rear delivery feed means 48 of the feeder adapter 21 (FIG. 4). The side walls 50,50 and the floor or bottom wall 51 project forwardly from a back wall 52 which provides an opening 53 for alignment with the intake opening of the feeder house 22 of the combine unit 23. Mounted in a chamber thus defined at the rear of feeder adapter 30 is a rotatable drum 54 of the feeder means 28 which is driven by a separate hydraulic motor 58 (see FIG. 12) for rotation about a transverse axis. The drum 54 has rigid spiral auger flights 55, and additionally a plurality of retractable fingers 56 projecting through a plurality of openings 57 which are arranged spirally about the drum 54. The amount of projection of these fingers 56 is controlled by an internal caming system (not shown) so that the fingers move to the most extended position on rotation of the drum as they approach the floor 51 and start to retract to a withdrawn position as they approach the opening 53 of the back wall 52. Accordingly, in operation as the cut crop is fed into a rear feed means 49, thus provided, the crop is quickly forced into the feeder house 22 of the attached combine unit 23.

Figure 5:
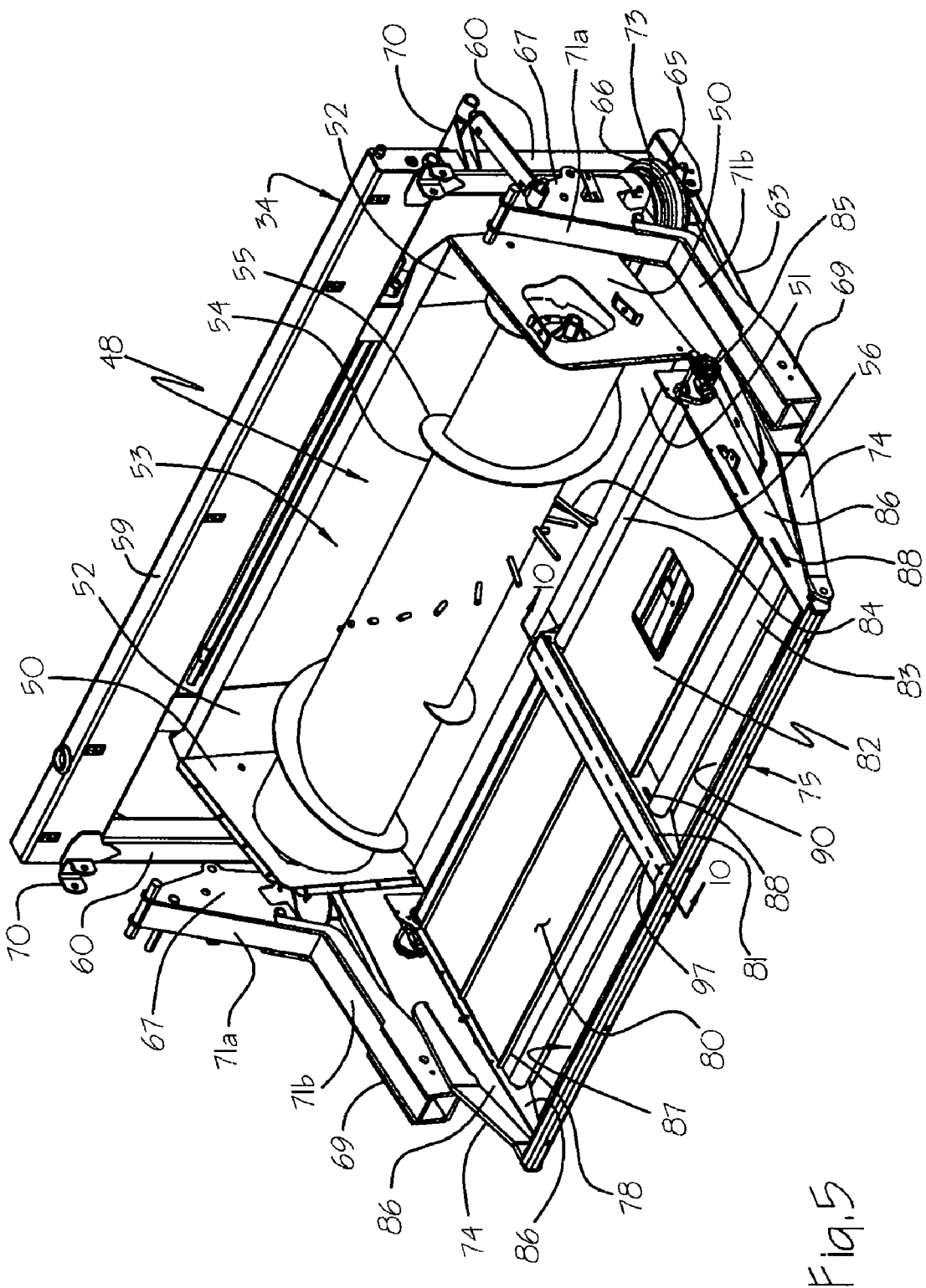
FIG. 5 is a front perspective view of one form of the feeder adapter of the present invention with one of the rearward feed canvases or belts removed for the sake of illustrating its remaining structure.

The rear basic framework 34 of the feeder adapter 30 which provides the rear surface 35 is formed of an upper header portion 59, a pair of vertical side columns 60,60 and a lower transverse member 61. Pivotally mounted on forwardly projecting lugs 62 (FIG. 6) affixed adjacent the lower juncture of the vertical side columns 60,60 and bottom horizontal member 61 at each side of the rear basic framework 34 at each side is a forwardly projecting link 63. At the rear end of each link 63 adjacent the pivotal connection with the rear basic frame there is carried a base plate 65 on which is mounted an air bag 66 which in turn supports a vertical pillar member 67. Extending forwardly from a lower portion of the pillar member 67 is a head support member 69, to which the forward end of the link 63 is pivotally connected. Forward faces 71a of the pillar member 67 and an upper faces 71b of the head support member 69, are shaped to be received within the downwardly depending struts 43 and forwardly projecting frame member 44 of the combine header 40 when the latter is mounted on the feeder adapter 21 (see FIG. 2 and 3). When the combine header is carried on the feeder adapter 21, connection are made by pins received and brackets 70,70 (see FIG. 5) which co-operate with lugs 79,79 extending rearwardly from transverse beam 41 (see FIG. 2), and additionally by pins secured in brackets 72,72 (FIG. 2) at the back of struts 43,43 of the combine header structure 40 (see FIG. 4) and pin receiving openings 73,73 in the pillar members 64,64 (FIG. 5).

The framework of the feeder adapter 21 has additional side frame members 74,74 at either side and projecting forward from frame member. The side frame members 74,74 are joined at their forward ends by a front frame member 75 of the feeder adapter 21 (FIG. 2), which when united with the combine header is located immediately behind the sickle bar assembly 46 (FIG. 3). Forward of the rearwardly disposed feed means 48 is a forwardly disposed rearward feed area 77 which in a preferred embodiment of the invention includes a belt conveyor system. This system is shown as including a pair of side-by-side drapers or belt conveyors 78 provide upper flights 80,80 which travel rearwardly when in a normal operating mode and not only receive cut crop which is brought rearwardly over the sickle bar assembly 46 in front, but also the cut crop which is delivered from the opposed ends of the transverse conveyors of the combine header 40. It is to be noted that while the belt conveyors 78 are shown in most Figures, they are not present on one side in FIG. 5 in order to better illustrate the suspending frame structure as well as the structure of the rock trap of the present invention.

The upper flight 80,80 of the two belts in the two parallel belt conveyor 78 are separated by a middle frame member 81, which will be described in more detail is hollow. The upper flights 80,80 each travel from a front idler roller 83, one of which is shown in FIG. 5, over a central floor area 82 to a rear drive roller 84. Hydraulic drive motors 85 are provided for optionally permitting travel of the upper flight in a reversed direction, i.e., in a forward direction for purposes which will be described in more detail. It may be seen that the axle of each front roller 83 is mounted for selective movement in slots 88 in the middle frame member 81 and outer side wall members 86,86 via automatic tensioning means indicated at 89 in FIG. 9 so as to permit adjustment of each front roller 83 so as to achieve optimum belt tension.

Figure 7:
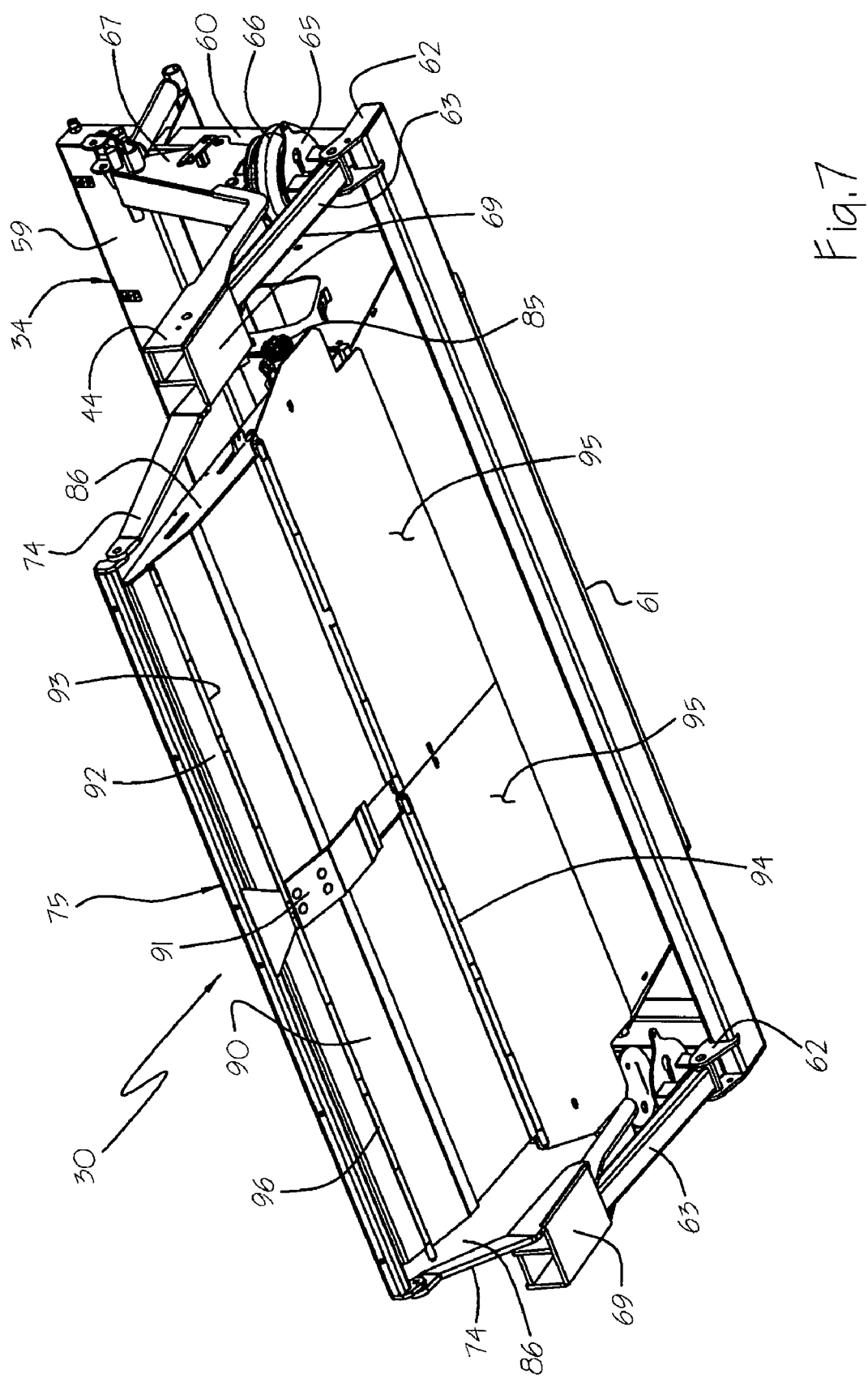
FIG. 7 is a front perspective view of the feeder adapter as shown in FIG. 5, but as seen from below the feeder adapter.

Returning to FIG. 3, it may be noted that when the feeder adapter 30 is in its operative position within the opening in the combine header structure 40 between the struts 43,43 and associate frame members 44,44, the front frame member 75 of the feeder adapter 30 is located closely behind the back of the sickle bar assembly 46 of the combine header structure 40. Because the front rollers 83,83 of the pair of belts 78,78 are spaced well behind the frame member 75 of the feeder adapter there is provided between the belts 78,78 and the front frame member 75 a rock collecting area 87. A trap door 90 normally provides a bottom to the rock collecting area. While the trap door 90 may be formed of two separate panels joined end to end by a central door connection plate member 91, the door functions as a single continuous panel extends fully between side walls 86,86 of the feed adapter 30. As best seen in FIG. 7, a front edge 93 of the trap door 90 is connected by way of a hinge 96 to a downwardly and rearwardly projecting flange 92 which forms part of the front frame member 75 of the feeder adapter 30. A rear edge 94 of the trap door 90 engages forward edge areas of bottom panels 95,95 located beneath the pair of belt conveyors 78 so as to normally close the space defined between side wall members 86,86, front frame member 75 and forward end of conveyor belts 78,78.

Figure 8:
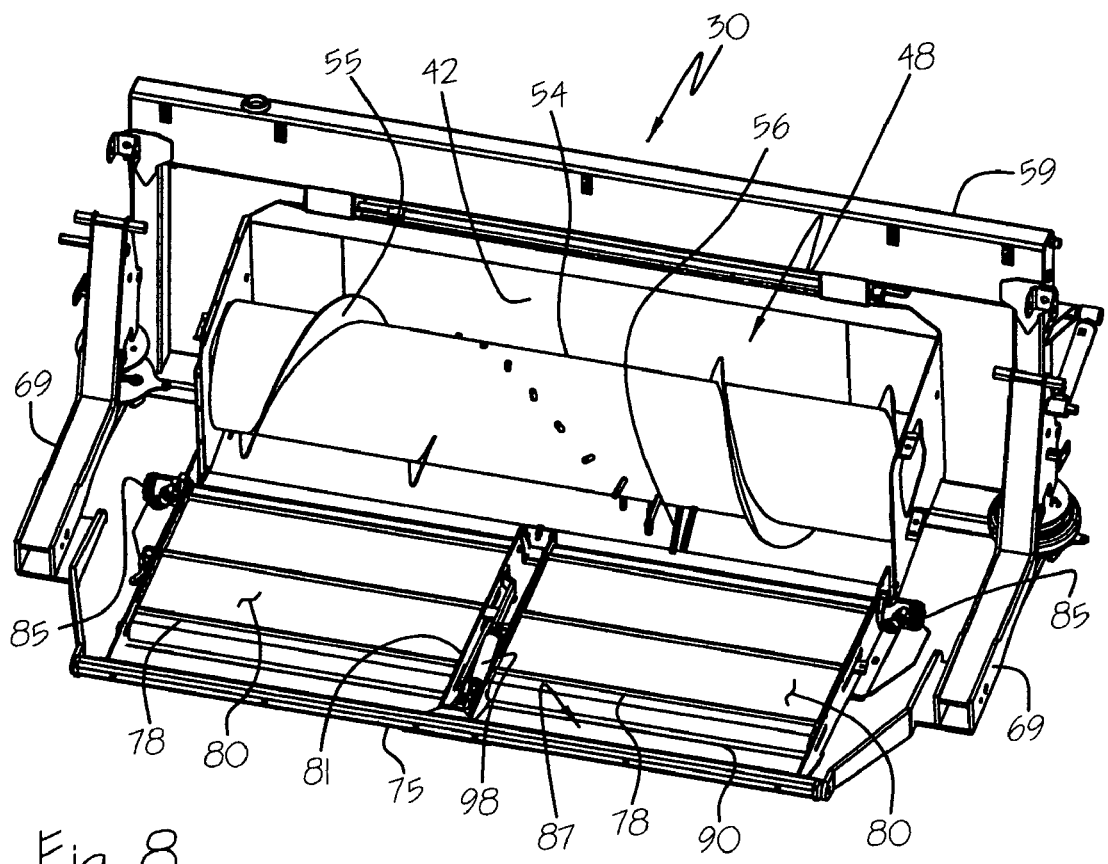
FIG. 8 is also a front perspective view as seen from above in FIG. 5, but with a cover plate of a central frame portion of the feeder adapter removed to show an operative portion of the trap door structure.
Figure 9:
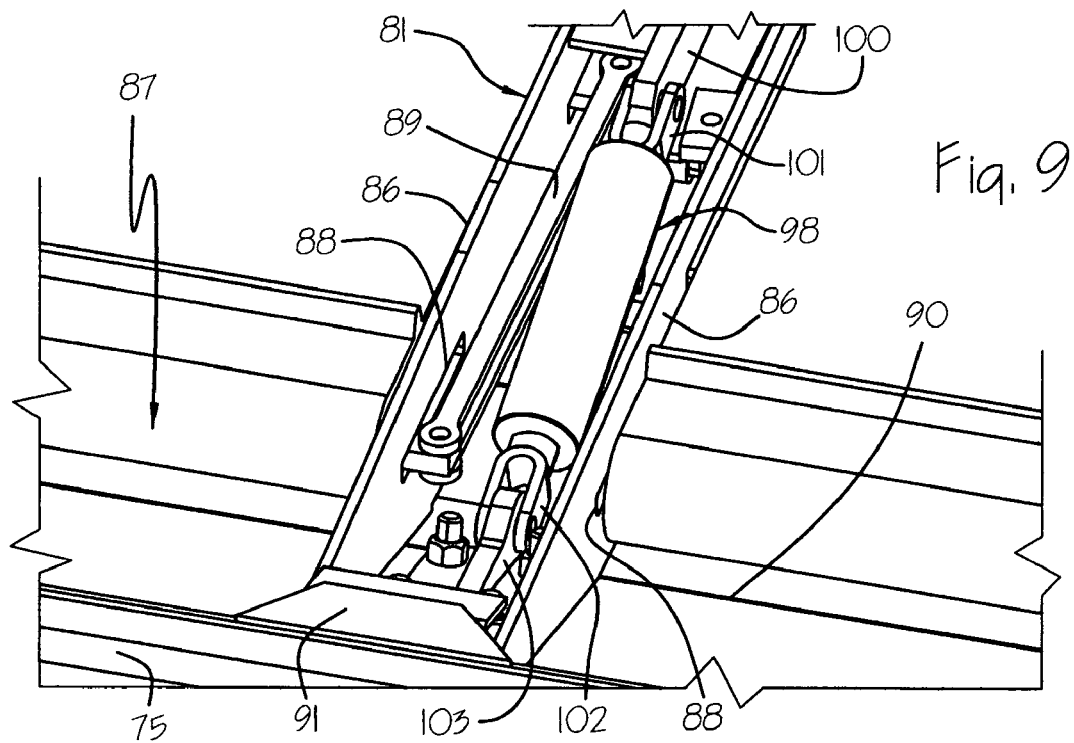
FIG. 9 is a view of the operative portion only of the trap door structure shown in FIG. 8 and on an enlarged scale for the sake of clarity.
Figure 10:
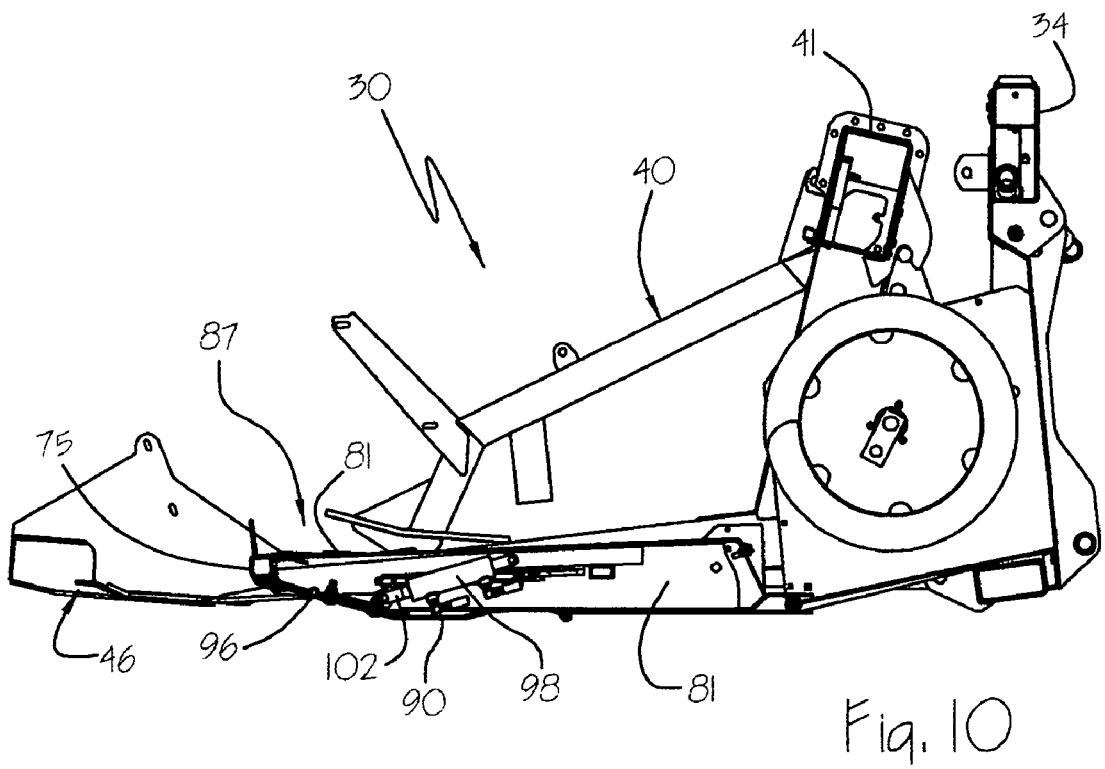
FIG. 10 is a cross section view of the feeder adapter, at least a portion of which is taken along the line 10-10 of FIG. 5 and showing the trap door and its related operative parts in a closed condition.
Figure 11:
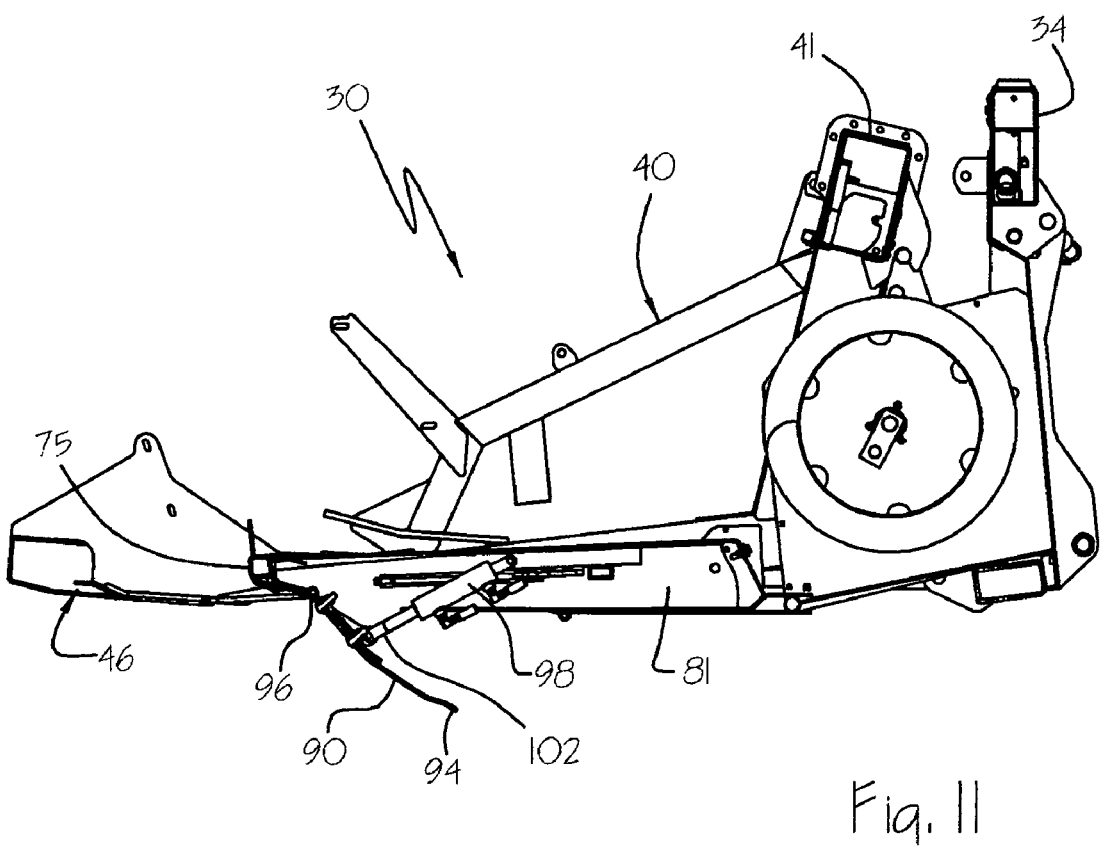
FIG. 11 is a cross sectional view like FIG. 10, but showing the trap door and its related operative parts in an open, rock dispensing condition.

As previously indicated the middle frame member 81 between the pair of conveyor belts 78,78 is of a hollow nature. It is normally closed by a cover plate 97, which has been removed in FIGS. 8 and 9 to show the control system of the trap door 90. With particular reference to FIG. 9, it can be seen that a hydraulic motor 98 is contained within the frame member 86, the hydraulic motor shown being a piston and cylinder type motor with a cylinder end 101 being pivotally connected to a stationary lug 100, and a piston rod end 102 being pivotally connected to a lug 103 which is connected to an upper surface of the connector plate member 91, which forms part of the trap door 90. As the piston rod end is connected to the door rearwardly of the hinge 96, expansion of the hydraulic motor 98 pushes the door downwardly from the position shown in FIGS. 8, 9 and 10 to the open position shown in FIG. 11, whereby any rocks or other debris present on the trap door 90 are free to fall beneath the combine header structure 40.

Figure 12:
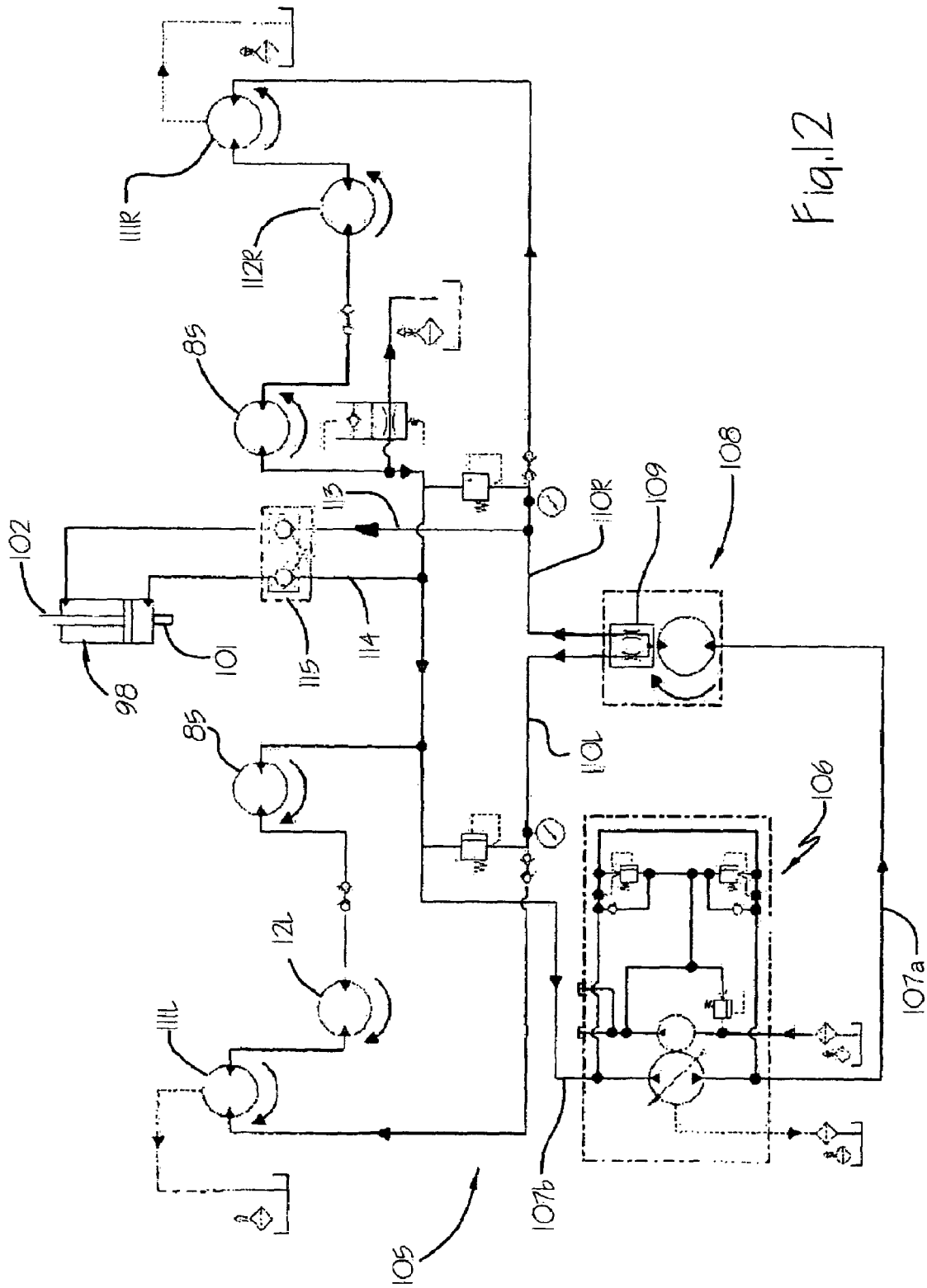
FIG. 12 is a schematic of a hydraulic circuitry including components for automatic opening and closing of the trap door of the rock trap

The hydraulic drive motors 85,85, which are also shown in schematic diagram of FIG. 12, are of a reversible type, as indicated, in order to permit reversing of the direction of travel of the upper flights 80,80 of the pair of belt conveyors 78,78. The hydraulic drive motors 85,85 receive fluid from a hydraulic circuitry, generally shown as 105, which is controlled from an operator's control station located in the cab (not shown) in the combine unit 23. The normal feed direction of travel of the upper flights of the belts is, of course, in a rearward feed direction so that on reversing of the motors 85,85, the travel of the upper flights 80,80 is in a forward unplugging direction. The hydraulic motor 98 which operates the trap door 90, is preferably connected to the same circuitry in a manner that when the motors 85,85 are reversed, the hydraulic motor 98 is activated to automatically open the trap door 90.

The hydraulic circuitry 105 includes a pressurized fluid supply from a reversible variable pump unit indicated at 106 in FIG. 12 which includes a charge pump adapter. The variable pump unit may be mounted on feeder adapter 30 adjacent the rear thereof and is driven by a PTO shaft connection to the prime mover of the combine unit 23 so as to receive its driven power therefrom. The hydraulic circuitry 105 includes input/output lines 107a, 107b, the hydraulic flow therein being reversible by way of a control signal provided to the variable pump unit 106 from the operator in the cab of the combine unit 23. When the system functions in a normal combining operation, the output of the reversible flow variable pump is through line 107a, which first passes through a reversible drive motor 108 of the drum 54 in the rear delivery feed means 48, which as previously described, is part of the feeder adapter 30. It is to be noted that this reversible drive motor 108 is provided with a flow divider 109. Thus, in normal operation, the pressurized fluid which passes through and thereby drives motor 108, is split into two similar circuits 110 R and 110 L. The flow to these two circuits provides driving power to the motors located on opposite sides of a center line of the combine header unit 40 and the feeder adapter 30, as will be described in more detail below.

As can be seen from FIG. 12, the fluid flow which has been split to service via line 110 R the motors at the right hand side of the united combine header 40 and feeder adapter 30, flows in series first through a motor 111 R, which is a right knife motor for reciprocating one knife located at the right hand end of the sickle bar assembly 46; then through a motor 112 R which drives a transverse conveyor, which may be in the form of a conveyor canvas of the combine header, at the right hand portion thereof; and then through motor 85 which has been previously described as driving the right hand belt conveyor 78 of the feeder adapter 30. Simultaneously counterpart components on the left hand portion of the combine header/feeder adapter combination are driven by flow from line 110 L passing in series through motors 111 L, 112 L and 85. The flow of fluid from the two circuits exits from lines 110 R and 110 R into common line 107b for return to the variable pump unit 106 to be thus re-circulated. As indicated, the above described mode of operation is during normal forward combining conditions. When certain conditions are encountered, such as a jamming of the cut crop at any point along the conveying systems or a rock has been encountered, the operator can control the variable pump to move to a reverse flow condition whereby the flow leaves the pump through line 107b and returns through line 107a. This causes all of the motors 108, 111 R. 11 L, 112 R, 112 L, and 85, 85 to operate in the opposite directions, thereby effectively backing up the crop from its normal transferred direction so as to relieve any jamming condition.

It is to be noted from FIG. 12 that the piston end 102 of the hydraulic cylinder 98 is connected to line 110 R by way of a hydraulic line 113, which during normal operation is an input line, while the cylinder end 101 is connected via line 114 to the line 107b, which during normal operation is the outlet line. Thus, it can be seen that when the combine is in the normal operating mode, the pressurized fluid of line 110 R is exposed to the piston rod end 102 of the hydraulic cylinder 98 so as to hold the trap door 90 of the rock collecting area in a closed position. However, when it is noted that a rock has collected in that area or has arrived on the upper surface of upper flights 80,80 of the belt conveyors 78, 78, a reversal of fluid output of motor 106 by the operator immediately results in the belt conveyors reversing as well as the shifting of that hydraulic motor 98 to open the trap door 90 to thereby drop any rock from the area 87 to beneath the combine header. A double pilot to open-check valve assembly 115 is provided for lines 113, 114 so as to ensure synchronized respective opening and closing of the pair of check valves in this assembly and thus flow in lines 113, 114 to and from the opposite ends of the hydraulic motor 98.

The locating of the rock collecting area 87 in the front of the belt conveyors of the feeder adapter 30 has been found to be very effective as compared to the positioning and nature of operation of rock traps in the prior art discussed above, many of which now depend on much more elaborate control systems. In a type of combine header utilizing the transverse belt system and a combine header with the belt type feeder adapter of this invention, it has been found that as the rocks which are picked up by the header and then dropped from the transversely travelling belts to the upper flights 80,80, they do not readily experience a quick transfer of direction rearwardly by the rearward travelling belts 78,78 of the feeder adapter, the latter of which are at least slightly inclined towards the rear. Moreover, with this type of header and feeder adapter system there is very clear visibility from the operator's station of the rock collecting area 87 and the rearwardly travelling upper flights 80,80 of the belts 78,78 of the feeder adapter. Once a rock has been detected by the operator and the control has been operated to reverse the direction of the upper flights 80,80, the trap door 90 is immediately opened whereby any rocks on the rock collecting area 87 are immediately dropped and any rocks which were on the flights are quickly carried back to the area 98 and dropped through the opened door area.

The initial cost of providing the simpler rock trap system of the present invention is slight compared to the more complex system of the prior art, and is far less subject to failure or damage.

While the rock trap of the present invention has been illustrated in an arrangement wherein separate header unit, feeder adapter unit and combine unit are joined to form a complete operating crop combine, and wherein belt type conveyors are utilized in transferring the crop transversely of the header and then rearwardly towards the combine feeder housing, the form location and nature of operation of the present rock trap features are features usage in most overall combine structures. Various modifications to the disclosed embodiment of the invention will be obvious to those skilled in the art without departing from the spirit of the invention as defined in the appending claims.

The invention claimed is:

1. A combine feeder adapter for use in a combine header to feed cut crop rearwardly of the combine header and into an intake defined by a frame of an intake feeder of a combine, the combine header including a transverse conveyor system for transferring the cut crop from behind the length of a sickle bar of said header to said combine feeder adapter;

said combine feeder adapter comprising:
a framework having a foremost portion for positioning behind said sickle bar of the combine header, and a rear portion for attachment to said frame of said intake feeder of said combine, conveyor means for receiving the cut crop directly from said transverse conveyor system of said combine header and delivering said cut crop rearwardly into said intake feeder, said conveyor means having a forward end positioned a distance behind the foremost portion of said framework so as to define a space between said foremost portion of said framework and said forward end of said conveyor means, a rock trap including a door located at least partially in said space and behind said foremost portion of said framework, said door normally being positioned in a closed position to form a bottom of said rock trap, said door being selectively movable from the normal closed position to an open position for dropping rocks and other debris accumulated in said rock trap beneath said combine header.

2. A combine feeder adapter as defined in claim 1, wherein said door is elongated in the transverse direction and has a front edge thereof hingedly connected to said front portion of said framework, said door having a rearward edge normally located in a closed condition beneath said forward end of said conveyor means.

3. A combine feeder adapter for use in a combine header to feed cut crop rearwardly of the combine header and into an intake defined by a frame of an intake feeder of a combine, the combine header including a transverse conveyor system for transferring the cut crop from behind the length of a sickle bar of said header to said combine feeder adapter;

said combine feeder adapter comprising:
a framework having a foremost portion for positioning behind said sickle bar of the combine header, and a rear portion for attachment to said frame of said intake feeder of said combine, conveyor means for receiving the cut crop directly from said transverse conveyor system of said combine header and delivering said cut crop rearwardly into said intake feeder, said conveyor means having a forward end positioned a distance behind the foremost portion of said framework so as to define a space between said foremost portion of said framework and said forward end of said conveyor means, a rock trap including a door located at least partially in said space and behind said foremost portion of said framework, said door normally being positioned in a closed position to form a bottom of said rock trap, said door being elongated in the transverse direction and having a front edge thereof hingedly connected to said front portion of said framework and a rearward edge normally located in the closed condition beneath said forward end of said conveyor means, and further including hydraulic actuator means connected between said framework and said door for normally holding said door in a closed position to maintain rocks collected therein in a confined condition in said space forward of said conveyor means;

wherein said door is selectively movable from the normal closed position to an open position for dropping rocks and other debris accumulated in said rock trap beneath said combine header.

4. A combine feeder adapter as defined in claim 3, wherein said framework includes a pair of side frame members and a central framework means connected at a front end to said front portion of said framework, thereby providing between the two side frame members and said central framework a pair of spaces containing a pair of side-by-side conveyors forming said conveyor means for the rearward delivery of said cut crop to said intake feeder of said combine.

5. A combine feeder adapter as defined in claim 4, wherein said central framework means of said framework includes a pair of frame members laterally spaced forming a chamber therebetween and housing said hydraulic actuator means.

6. A combine feeder adapter as defined in claim 5, wherein said hydraulic actuator is a piston and cylinder type motor connected at one end thereof between said pair of members of said central framework means and at another end thereof to a portion of said door rearwardly of the front edge thereof whereby an expansion of said motor said door occupies a downwardly hinged, open position.

7. A combine feeder adapter as defined in claim 6, wherein said pair of conveyors provide upper belt flights slightly inclined upward in a rearward direction, said upper belt flights being driven by reversible, hydraulic, drive motor means, and wherein said drive motor means receives pressurized fluid from a hydraulic circuitry in said feeder adapter by way of operator control means in said combine, the normal feed direction of travel of said upper belt flights being in a rearward, feed direction, whereby on reversing of said motor means, the travel of said upper belt flights is in a forward unplugging direction.

8. A combine feeder adapter as defined in claim 7, wherein said piston and cylinder type motor of said hydraulic actuator is connected to said hydraulic circuitry whereby said piston and cylinder type motor is connected to a source of pressurized fluid to activate opening of said door on reversing of said motor means driving said upper belt flights.

9. A combine feeder adapter as defined in claim 8, wherein said reversibly, hydraulic driven motor means are supplied by a bi-directional pump whereby its direction of flow of pressurized fluid to said motor means of said pair of conveyors is reversed to change the direction of travel of said belt flights, and wherein said hydraulic actuator of said door is a double acting cylinder provided with a pilot operated check valve of a door closure side of said cylinder for holding oil in said cylinder in a door closure position during normal forward drive of said belt flights, whereby on reversing of said pump to reverse direction of said belt flights, pressurized fluid is subjected to an opposite side of said cylinder to force said door to an opening position while said belts are operated in said reverse direction.

10. A combine header comprising;
a transversely extending framework with rear connection means at a central portion thereof for attachment to a front intake housing of a combine unit, a front crop cutting sickle bar mechanism extending along a forward edge of said framework, a transverse conveyor means rearwardly of said sickle bar for moving the cut crop from behind said sickle bar to an area at a central area of said framework, a rearwardly directed feeder means at said central portion of said framework for feeding said cut crop received from said transverse conveyor means rearwardly to said intake housing of said combine, said rearwardly directed feeder means having a forward end spaced behind said sickle bar and thereby providing a rock collecting area between said sickle bar and said forward end of said feeder means, trap door means forward of said rearwardly directed feeder means normally held in a closed condition and forming a bottom surface of said rock collecting area, and trap door operating motor means for selectively providing movement of said trap door to an open rock dispensing portion.

11. A combine header as defined in claim 10, and wherein said rearwardly directed feeder means includes a pair of side-by-side, driven conveyor belts providing parallel upper flights for carrying said cut crop towards said front intake housing on the combine unit, said belts being separated by a hollow frame member, and wherein said trap door operating motor means includes a trap door operating hydraulic cylinder unit located within said hollow frame member.

12. A combine header as defined in claim 11, and wherein said header is provided with an opening elongated in the transverse direction in front of said pair of conveyor belts, said opening providing an edge thereof extending in the transverse direction,
   wherein said trap door means has a hinged connection along the transverse edge of said opening, and
   wherein said operating hydraulic cylinder unit is connected to said trap door for swinging said trap door about said hinged connection between a closed position and a downwardly depending rock dispersing open position.

13. A combine as defined in claim 12,
   wherein, said belts are driven by a reversible hydraulic driven motor supplied from a hydraulic circuitry by a bi-directional pump said bi-directional pump being controlled by way of an operation control means in said combine whereby the normal feed direction of said upper belt flights is in a rearward feed direction, but on reversing of said bi-directional pump the travel of said belts is reversed, and
   wherein, said operating hydraulic cylinder unit of said trap door is connected to said hydraulic circuitry whereby said unit is connected to a source of pressurized fluid to activate opening of said trap door means on reversing of said motor means of said belts by reversing of said bi-directional pump.

14. A header unit and feeder adapter combination for use with a combine unit in harvesting a crop,
   said header unit including:
   a framework carrying a driven sickle bar mechanism extending along a front edge thereof
   said framework defining a central opening therein for selective reception of the feeder adapter,
   a pair of conveyor means for receiving cut crop from said sickle bar and delivering said cut crop transversely toward said central opening;
   said feeder adapter including,
   a frame structure,
   rear attachment means on said frame structure for connection to a framework of an intake feeder of the combine unit,
   interlocking means for selective attachment of said frame structure of said feeder adapter to said framework of said header unit when said feeder adapter is driven by said combine unit into said central opening from behind said header unit,
   feed belt means within said feeder adapter for collecting cut crop delivered by said conveyor means of said header unit,
   drive means for normally moving said belt means in a direction to deliver said cut crop rearwardly towards the intake feeder of said combine unit;
   said feeder adapter in combination with said header unit defining an open-topped rock collecting area forward of said feed belt means and rearward of said sickle bar, and
   a trap door forming a bottom surface of said rock collecting area, said trap door having actuating means for moving said door between a normal debris collecting position and a debris dumping position.

15. The combination of claim 14, wherein said frame structure of said feeder adapter includes:
   a pair of parallel side members transversely spaced for reception within and adjacent side edges of the central opening in said framework of said header unit,
   a transverse frame member extending between forward ends of said parallel side members of said feeder adapter and positioned to be located juxtaposed said framework carrying said sickle bar mechanism of said header unit, and wherein;
   said feed belt means of said feeder adapter has a forward end spacing rearwardly of said transverse frame member and thereby defining therebetween said rock collecting area; and further comprising,
   a trap door means having a forward edge connected by a hinge means to said transverse frame member and forming a bottom surface of said rock collection area, and
   motor means for selectively pivoting said trap door means about said hinge means to open said rock collecting area for disposing of rocks collected herein.

16. The combination of claim 15, wherein said feed belt means comprises a pair of conveyor belts providing upward surfaces for transporting cut crop rearwardly as said conveyor belts are driven by said drive means in the normal direction during harvesting,
   said pair of belts being separated by a hollow frame structure extending parallel to said side members of said frame structure of said feeder adapter, and
   wherein said motor means for pivoting said trap door means includes a hydraulic actuator means contained in said hollow frame structure.

17. The combination of claim 16, wherein said drive means of said conveyor belts includes a reversible, hydraulic, drive motor; and
   said motor means for pivoting said trap door is a piston and cylinder type motor pivotally connected at one end within said hollow frame member and at the other end thereof to said trap door;
   and further comprising
   a hydraulic circuitry in said combination controllable by operator control means in said combine unit.

18. The combination of claim 17, wherein said circuitry is adapted to be supplied by a bi-directional pump controlled by said operator control means whereby on the reversal of the direction of flow of pressurized fluid in said hydraulic circuitry for reversing the direction of travel of said conveyors, the reversal of flow activates said piston and cylinder type motor to force said trap door to an open condition, whereby said trap door is automatically opened on selected reversal of travel of said conveyor belts.

19. The combination of claim 18, wherein said piston and cylinder type motor is a double acting cylinder with each end thereof is connected to said hydraulic circuitry, whereby one end of, said piston and cylinder type motor receives pressurized hydraulic fluid on reversal of said fluid in said circuitry to reverse said travel of said belts to open said trap door, and a second end of said piston and cylinder type motor receives pressurized fluid by way of a pilot operated check valve for closing and maintaining said door in a closed condition upon the fluid in said circuitry being circulated in a direction to cause travel of said belts in a normal operational direction.

* * * * *